United States Patent Office 3,036,069
Patented May 22, 1962

3,036,069
ACETOXYLATED 17α-CARBOXYETHYL - 17β - HYDROXYANDROST-4-EN-3-ONE LACTONES AND INTERMEDIATES
Edward A. Brown and John A. Cella, Skokie, Ill., assignors to G. D. Searle & Co., Chicago, Ill., a corporation of Delaware
No Drawing. Filed Aug. 10, 1959, Ser. No. 832,484
4 Claims. (Cl. 260—239.57)

This invention relates to acetoxylated 17α-carboxyethyl-17β-hydroxyandrost-4-en-3-one lactones, processes for their manufacture, and intermediates whereby these processes proceed. More particularly, this invention relates to compounds of the formula

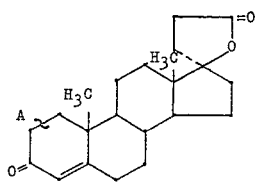

wherein A~ represents an acetoxy radical attached to one of the carbons in ring A.

Equivalent to the foregoing lactones for purposes of this invention are the corresponding hydroxy acids and their alkali salts of the formula

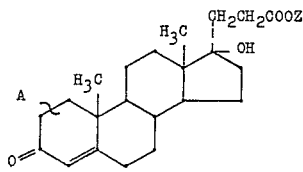

wherein A~ signifies an acetoxy radical as above and Z represents hydrogen, an alkali metal, or the ammonium radical. Those skilled in the art will appreciate that the described salts readily derive from the corresponding lactones on contact with aqueous alkali. The free acids, in turn, are obtained from the salts by a critically brief exposure to a proton source; prolongation of the exposure time induces lactonization.

The compounds of this invention are useful because of their valuable pharmacological properties. For example, they are potent diuretics, being adapted to block the effect of desoxycorticosterone acetate on urinary sodium and potassium. It follows that the intermediates from which these compounds can be obtained are also useful.

Manufacture of the subject compositions starts with 17α-(2-carboxyethyl)-17β-hydroxyandrost-4-en-3-one lactone, an embodiment of the invention disclosed and claimed in United States Patent No. 2,705,712 to John A. Cella. This material is converted to the 6β-bromo derivative on heating with N-bromosuccinimide in carbon tetrachloride solution; and the bromo derivative, in turn, affords 2-acetoxy-17α-carboxyethyl - 17β-hydroxyandrost-4-en-3-one lactone on heating with potassium acetate in acetic acid solution. Oxidation of 17α-(2-carboxyethyl)-17β-hydroxyandrost-4-en-3-one lactone with osmic acid and hydrogen peroxide in ether solution provides the corresponding 4,5 saturated diol, which then is dehydrated with boiling methanolic hydrogen chloride and esterified with acetic anhydride in pyridine solution to give 4-acetoxy-17α-carboxyethyl-17β-hydroxyandrost-4-en-3-one lactone.

The following examples describe in detail compounds illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted.

Example 1

6β-bromo-17α-(2-carboxyethyl)-17β-hydroxyandrost-4-en-3-one lactone.—To 34 parts of 17α-(2-carboxyethyl)-17β-hydroxyandrost-4-en-3-one lactone dissolved in 1600 parts of warm carbon tetrachloride is added, with agitation, 18 parts of N-bromosuccinimide. An exothermic effect produces gentle boiling which is sustained for one hour by heating with continued agitation under reflux. The reaction mixture is then cooled to room temperature and filtered. The filtrate is freed of solvent by vacuum distillation, leaving an oily residue which solidifies on trituration with hexane. Recrystallization from a mixture of acetone and hexane affords pure 6β-bromo-17β-(2-carboxyethyl) - 17β - hydroxyandrost-4-en-3-one lactone, which melts in the range 143.5–148° (with decomposition).

Example 2

2-acetoxy-17α-(2-carboxyethyl)-17β-hydroxyandrost-4-en-3-one lactone.—To 7 parts of 6β-bromo-17α-(2-carboxyethyl)-17β-hydroxyandrost-4-en-3-one lactone is added a solution of 28 parts of freshly fused potassium acetate in 180 parts of glacial acetic acid. The resultant mixture is heated at the boiling point under reflux for 4 hours. Solution occurs. The solution is cooled and poured into 1000 parts of water. The gummy product which precipitates is collected and chromatographed on silica gel, using benzene and ethyl acetate as developing solvents. From the eluate comprising 90% benzene and 10% ethyl acetate, on evaporation of solvent, there is obtained a crystalline fraction which, twice recrystallized from methanol, melts at 193–196°. This material is 2-acetoxy-17α-(2-carboxyethyl) - 17β - hydroxyandrost-4-en-3-one lactone, of the formula

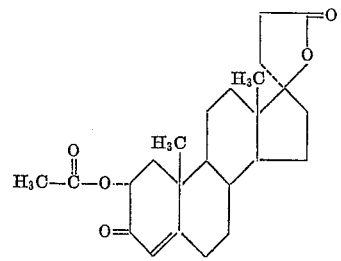

Example 3

17α - (2-carboxyethyl) - 4,5,17β-trihydroxyandrostan-3-one γ-lactone.—To a solution of 200 parts of 17α-(2-carboxyethyl)-17β-hydroxyandrost-4-en-3-one lactone in 28,000 parts of anhydrous ether is added a solution of 8 parts of osmic acid in 660 parts of anhydrous ether, followed by 4 parts of hydrogen peroxide dissolved in 660 parts of tert-butyl alcohol. After 3 hours, an additional one part of hydrogen peroxide dissolved in 160 parts of tert-butyl alcohol is introduced, whereupon the solution is let stand at room temperatures overnight. Dense, colorless crystals precipitate. Collected on a filter and washed thereon with ether, they melt in the range 235–250° (with decomposition). Strong infrared absorptions at 2.83 and 2.87 microns and an adsorption band at 5.81 microns confirm the presence of hydroxyl and saturated carbonyl groups, respectively. The material thus isolated is 17α - (2-carboxyethyl)-4,5,17β-trihydroxyandrostan-3-one γ-lactone.

Example 4

*4-acetoxy - 17α - (carboxyethyl)-17β-hydroxyandrost-4-en-3-one lactone.*—A mixture of 7 parts of 17α-(2-carboxyethyl) - 4,5,17β-trihydroxyandrostan-3-one γ-lactone obtained by the procedure of the preceding Example 3, 40 parts of methanol, and 200 parts of concentrated hydrochloric acid is heated at the boiling point under reflux for 5 minutes. The resultant solution is quickly cooled and diluted with 400 parts of water. The yellow oil which precipitates is extracted with chloroform. The chloroform extract is washed with water and dried over anhydrous sodium sulfate. The solvent is removed by distillation and the residue is taken up in a mixture of 20 parts of acetic anhydride and 20 parts of pyridine. The resultant solution is let stand at room temperatures overnight, then poured into 200 parts of water. The mixture so produced is extracted with chloroform; and the chloroform extract is washed with water, dried over anhydrous sodium sulfate, and stripped of solvent by distillation. The oily residue is chromatographed on silica gel, using benzene and ethyl acetate as developing solvents. From the eluate comprising 95% benzene and 5% ethyl acetate, on evaporation of solvent, there is obtained an oil which is evaporatively distilled at 175° under 0.2 mm. pressure to give a clear "glass." This material is the desired 4 - acetoxy - 17α - (2-carboxyethyl)-17β-hydroxyandrost-4-en-3-one lactone, characterized by a molar extinction coefficient of 17,500 at 244 millimicrons and carbonyl peaks in the infrared spectrum at 5.68, 5.75, and 5.9 microns corresponding to the lactone, acetate, and 3-ketone functions. The product has the formula

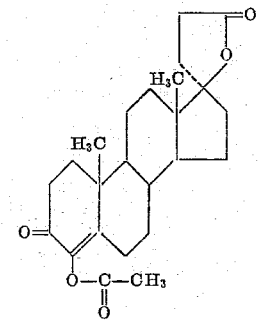

What is claimed is:
1. 2α - acetoxy - 17α - (2-carboxyethyl) - 17β-hydroxyandrost-4-en-3-one lactone.
2. 4 - acetoxy - 17α - (2-carboxyethyl) - 17β - hydroxyandrost-4-en-3-one lactone.
3. As an intermediate, 17α-(2-carboxyethyl)-4,5,17β-trihydroxyandrostan-3-one γ-lactone.
4. A compound selected from the group consisting of 2α - acetoxy-17α-(2-carboxyethyl)-17β-hydroxyandrost-4-en-3-one lactone and 4-acetoxy-17α-(2-carboxyethyl)-17β-hydroxyandrost-4-en-3-one lactone.

References Cited in the file of this patent
UNITED STATES PATENTS
2,919,286   Levy et al. _____ Dec. 29, 1959